Jan. 17, 1967  J. JABLIN  3,298,680
VACUUM DEGASSING APPARATUS
Filed June 2, 1964  2 Sheets-Sheet 1
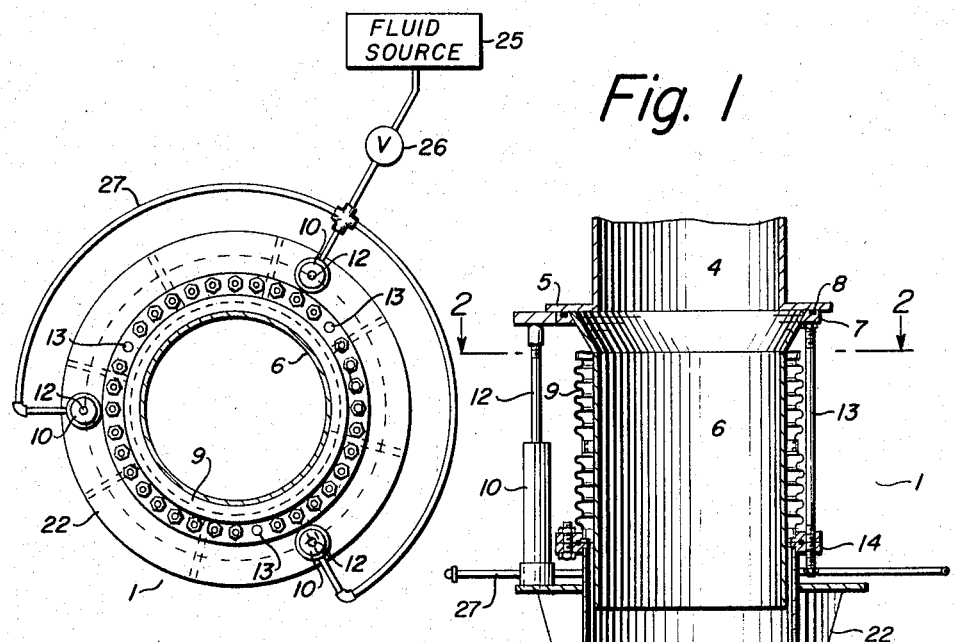
Fig. 1
Fig. 2
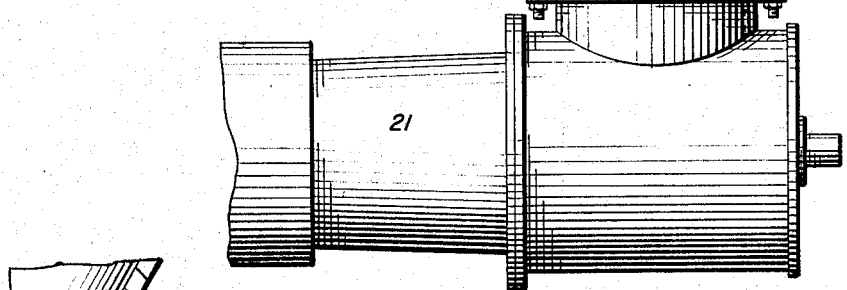
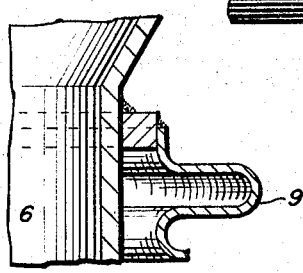
Fig. 3
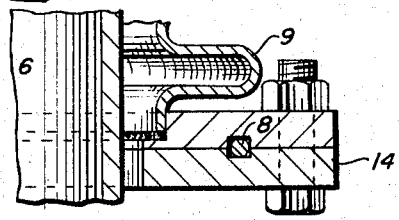
INVENTOR.
Richard Jablin

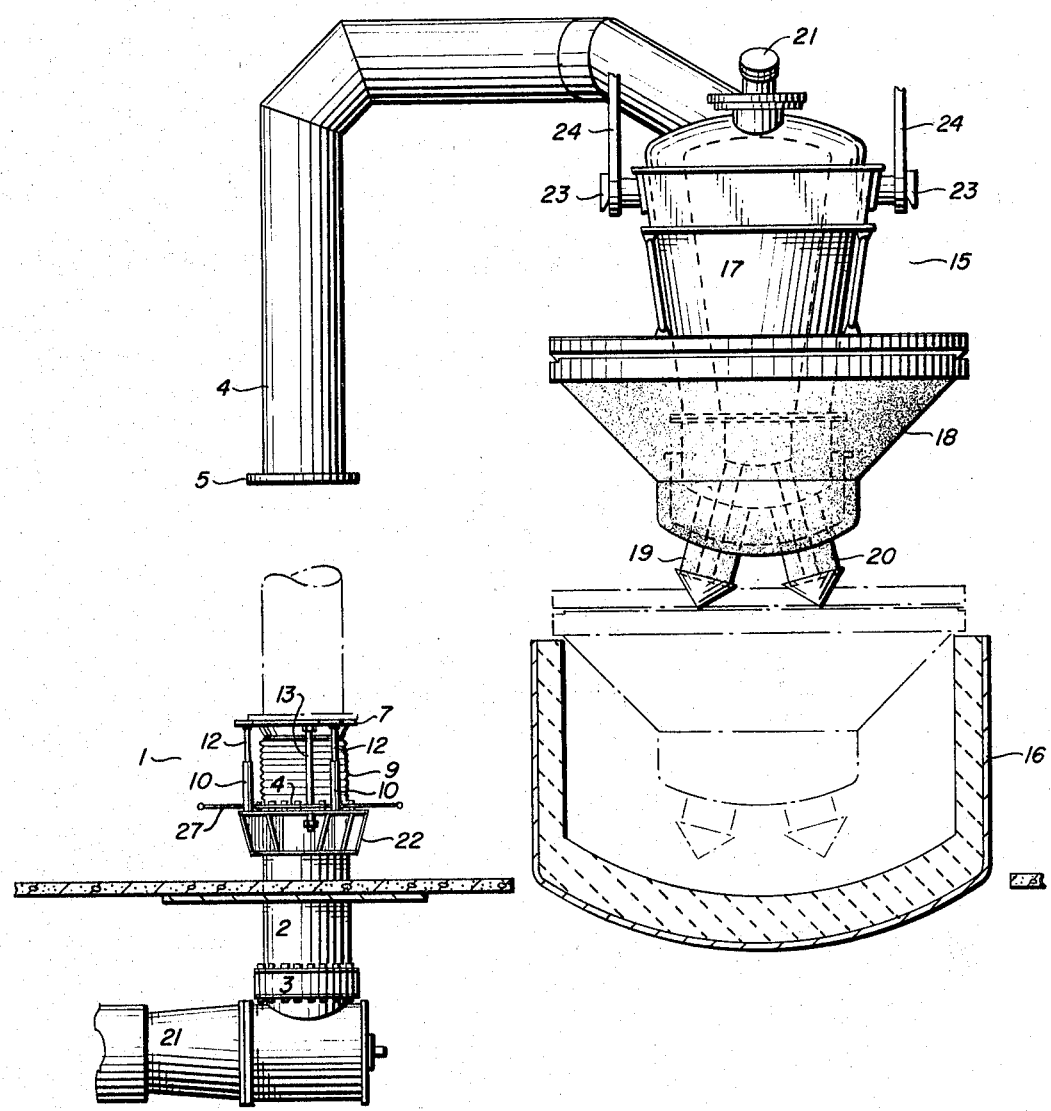

United States Patent Office 3,298,680
Patented Jan. 17, 1967

3,298,680
VACUUM DEGASSING APPARATUS
Richard Jablin, Bethlehem, Pa., assignor, by mesne assignments, to Bethlehem Steel Corporation, a corporation of Delaware
Filed June 2, 1964, Ser. No. 371,983
1 Claim. (Cl. 266—34)

This invention relates to a pipe joint assembly. It relates particularly to a pipe joint assembly for joining two sections of pipe in a vacuum line.

Many different types of apparatus and techniques have been proposed to degas molten metal in a vacuum. Regardless of the particular type of equipment used, all vacuum degassing apparatus requires a vacuum line to connect the degassing apparatus to the vacuum pumps.

Several different types of vacuum degassing apparatus have been designed to be portable. Such apparatus must either have a flexible vacuum line or a number of swivel or universal joints in the vacuum line to permit relatively free movement of the vacuum degassing apparatus. Flexible vacuum lines of large diameter have not been very successful at low vacuums because of the tendency of atmospheric pressure to collapse the line. Swivel and universal joints in a vacuum line are difficult and expensive to construct and to maintain in air tight condition. These difficulties can be avoided by using a rigid vacuum pipe attached to the degassing apparatus which has a quick connector or joint that permits the pipe to be tightly joined to a fixed vacuum line at one or sevreal locations.

It is therefore an object of my invention to provide a pipe joint that will enable two sections of rigid piping to be joined together in a matter of a few seconds.

It is a further object of my invention to provide a pipe joint that will be air tight at pressures of 1 mm. of mercury or less.

Another object of my invention is to provide a pipe joint which permits a certain amount of free axial movement to allow for thermal expansion or variable length of the members to be joined.

It is a still further object of my invention to provide a joint that will counteract the internal axial thrusts set up in the vacuum line which tend to collapse the joint.

The foregoing objects and the means whereby they are attained will be more fully understood from the following description and claims together with the drawings in which FIGURE 1 is a sectional elevation view of the pipe joint assembly.

FIGURE 2 is a sectional view taken along line 2—2 of FIGURE 1.

FIGURE 3 is a detailed sectional view of the bellows used to join various components of the pipe joint assembly.

FIGURE 4 is an elevation view, partially in section, showing the pipe joint assembly installed in a vacuum line leading from one type of apparatus used for vacuum degassing molten metal in an electric arc furnace.

FIGURE 1 shows the pipe joint assembly 1 in a vacuum line where 2 is a fixed pipe member leading to a vacuum pump or pumps 21. A butterfly valve 3 is inserted near the downstream end of pipe 2 to close off this section of the line if so desired. A pipe member 4 leads to the vacuum degassing apparatus 15 as shown in FIGURE 4. The downstream end of pipe member 4 terminates in a horizontal flange 5.

A tubular sleeve member 6, flared at its upstream end, has a horizontal flange 7 formed or attached to the upstream end which opposes horizontal flange 5 of pipe member 4. An O-ring seal 8 is set into a groove formed in the face of flange 7 or flange 5 if so desired. The downstream end of sleeve member 6 fits inside and is in telescoping relation with the upstream end of pipe member 2. A tubular bellows member 9 surrounds the sleeve member 6. One end of the bellows member 9 is attached in an air-tight manner to the exterior of sleeve member 6 near its upstream end, while the other end of bellows member 9 is similarly attached at or near the upstream end of pipe member 2 by opposed flanges 14 bolted together. An O-ring seal 8 is set into a groove formed in one or both of flanges 14 to form an air-tight seal.

A plurality of hydraulic jacks 10 are spaced around the pipe joint assembly 1 and are rigidly attached to fixed pipe member 2 by collar 22. The piston rods 12 of the hydraulic jacks 10 bear against an extension of horizontal flange 7 of tubular sleeve member 6.

A plurality of headed guide rods 13 are spaced around the joint assembly and are attached to horizontal flange 7. The guide rods 13 are free to slide through holes bored in opposed flange 14, and prevent the point assembly and in particular bellows member 9 from being overextended.

FIGURE 2 shows the spacing of the hydraulic jacks 10 and the guide rods 13 around the joint assembly.

In FIGURE 4 is shown, by way of illustration, the pipe joint assembly 1 in a vacuum line leading from vacuum degassing apparatus 15 of the "gas lifter" type in which molten metal is lifted up leg 19 into vacuum chamber 17 by injecting a gas into leg 19. The metal is degassed in chamber 17 with the deleterious gases being removed by exhaust pipe member 4. The metal is then discharged down leg 20. It is also apparent that the joint assembly can be used with any other type of vacuum degassing apparatus having a section of vacuum piping which requires quick positive connection to a fixed vacuum line. The vacuum degassing apparatus 15 is shown in solid lines in FIGURE 4 in the operative position, and in dotted lines in the operative position for degassing molten metal in an electric arc furnace 16, although such apparatus could be used to degas metal in other types of furnaces, ladles or other vessels as well. In the installation shown in FIGURE 4, the vacuum chamber 17 rests in and is fastened to a refractory-face heat shield 18. The heat shield 18 protects the vacuum chamber 17 from the heat of the furnace after the roof and electrodes (not shown) have been removed and the vacuum chamber 17 and protective shield 18 have been lowered into the furnace.

The vacuum chamber 17 is equipped with trunnions 23 which permit crane hooks 24 to pick up the preheated vacuum chamber 17, the heat shield 18 and the pipe member 4 rigidly attached to vacuum chamber 17 from a storage stand (not shown) and transport them to the waiting furnace. Vacuum chamber 17 is also equipped with a sight port 21 and a preheating burner (not shown) mounted in the roof. When the vacuum degassing apparatus 15 is positioned in the furnace, flange 5 on the downstream end of pipe member 4 is slightly above and in general alignment with flange 7 of sleeve member 6. Fluid under pressure from a single source 25 by conduits 27 is then simultaneously injected below the pistons of each of the hydraulic jacks 10 extending in unison piston rods 12 and thereby forcing flanges 7 and 5 together in parallel relationship compressing seal 8. The fluid is then locked in the cylinder by a valve 26 and the jacks 10 then become rigid members able to resist the axial compressive forces created by the less than atmospheric pressure in the pipes as pumping down begins. At the conclusion of the degassing process the fluid in the jacks 10 is released by valve 26 causing the piston rods 12 to drop, and provide clearance for the removal of vacuum degassing apparatus 15 and pipe member 4 by the crane in a matter of a few seconds.

As many possible embodiments may be made of the invention without departing from the scope thereof, it is to be understood that all matter set forth hereinabove or shown in the accompanying drawings is to be interpreted as illustrative and not limiting.

I claim:

Apparatus for the vacuum degassing of molten metals comprising (a) a portable vacuum chamber,
(b) a vacuum pump,
(c) a first exhaust pipe member rigidly connected to said vacuum chamber, extending outwardly and downwardly from said vacuum chamber, and having its downstream end terminating in a horizontally disposed flange,
(d) a second exhaust pipe member rigidly connected to said vacuum pump, and having its upstream end terminating in spaced relationship to the downstream end of said first pipe member,
(e) a tubular sleeve member having its downstream end inside and in telescopic relation with the upstream end of said second exhaust pipe member and having its upstream end terminating in a horizontally disposed flange,
(f) a tubular bellows member surrounding said sleeve member and having its downstream end attached to said second exhaust pipe member and its upstream end attached to the exterior of said sleeve member and comprising an air-tight seal between said sleeve member and said second exhaust pipe member,
(g) a plurality of equally spaced fluid operated piston-cylinder jacks, means supporting said jacks in fixed relationship to said second exhaust pipe, said jacks surrounding and spaced outwardly from said belows member and supporting said flange of said tubular sleeve member,
(h) means connecting the cylinders of said jacks to a single source of fluid and a valve means for simultaneously introducing fluid below the pistons of each of said jacks raising said jacks in unison and urging said flange of said sleeve member parallel to and into air-tight relationship against said flange of said first exhaust pipe member immediately prior to degassing, said valve means adapted for locking said jacks in a fixed position during the vacuum degassing for resisting the axial compressive forces created in said first exhaust pipe member and said tubular sleeve member.

References Cited by the Examiner

UNITED STATES PATENTS

| | | | |
|---|---|---|---|
| 919,213 | 4/1909 | Ramsey | 285—302 |
| 1,475,289 | 11/1923 | Diescher | 285—19 |
| 1,911,311 | 5/1933 | Ernst | 285—302 X |
| 2,476,929 | 7/1949 | Thomas | 285—300 |
| 2,604,339 | 7/1952 | Kaysing et al. | 285—300 |
| 2,640,317 | 6/1953 | Fentress | 285—300 X |
| 2,840,394 | 6/1958 | Rohr | 285—226 |
| 2,955,850 | 10/1960 | Bellinger | 285—302 X |
| 3,001,801 | 9/1961 | Downing | 285—301 X |
| 3,149,959 | 9/1964 | Nicholson | 266—34 X |
| 3,152,206 | 10/1964 | Philbrick et al. | 266—34 |
| 3,195,873 | 7/1965 | Philbrick | 266—34 |

FOREIGN PATENTS 613,350  11/1948  Great Britain.

CARL W. TOMLIN, *Primary Examiner.*

D. W. AROLA, *Assistant Examiner.*